United States Patent [19]

Cohr

[11] Patent Number: 5,234,440
[45] Date of Patent: Aug. 10, 1993

[54] EAR TAG APPLICATOR

[75] Inventor: Lindsay W. J. Cohr, Palmerston North, New Zealand

[73] Assignee: Allflex New Zealand Limited, New Zealand

[21] Appl. No.: 781,110

[22] Filed: Oct. 22, 1991

[30] Foreign Application Priority Data

Oct. 23, 1990 [NZ] New Zealand .................. 235791

[51] Int. Cl.[5] ............................................. A61B 17/04
[52] U.S. Cl. ................................... 606/117; 606/116; 40/300; 40/301
[58] Field of Search .............. 606/116, 117, 139–150; 604/57–64; 227/18, 32, 38; 40/300, 301; 72/109

[56] References Cited

U.S. PATENT DOCUMENTS

| | | |
|---|---|---|
| 3,734,375 | 5/1973 | Bone et al. |
| 4,474,572 | 10/1984 | McNaughton et al. ............ 606/117 |
| 4,506,670 | 3/1985 | Crossley ................... 606/117 |
| 4,516,577 | 5/1985 | Scott et al. ................ 606/117 |
| 4,738,258 | 4/1988 | Cohr . |
| 4,932,953 | 6/1990 | Cohr ....................... 606/117 |
| 4,943,294 | 6/1990 | Knapp ..................... 606/117 |
| 4,976,686 | 12/1990 | Balletal ................... 606/117 |

FOREIGN PATENT DOCUMENTS

| | | | |
|---|---|---|---|
| 2463581 | 8/1979 | France . | |
| 8801974 | 3/1990 | Netherlands ........... 606/117 |
| 2055670 | 3/1981 | United Kingdom ......... 606/117 |

*Primary Examiner*—Stephen C. Pellegrino
*Assistant Examiner*—Glenn Dawson
*Attorney, Agent, or Firm*—Blakely, Sokoloff, Taylor & Zafman

[57] ABSTRACT

An applicator tool for animal ear tags the applicator tool having a tag reception area in which a tag to be applied can be located. Tag engagement means are coupled with operative means whereby the tag engagement means can apply a force to at least part of the tag in the tag reception area to apply the tag to an animal. The applicator tool includes tag location means with which a plurality of tags which are conjoined by lugs can be located. Tag transport means which is operative to transport a tag from the plurality of conjoined tags to the tag reception means. Removing means is provided for removing a single tag to be transported from the plurality of conjoined tags.

11 Claims, 5 Drawing Sheets

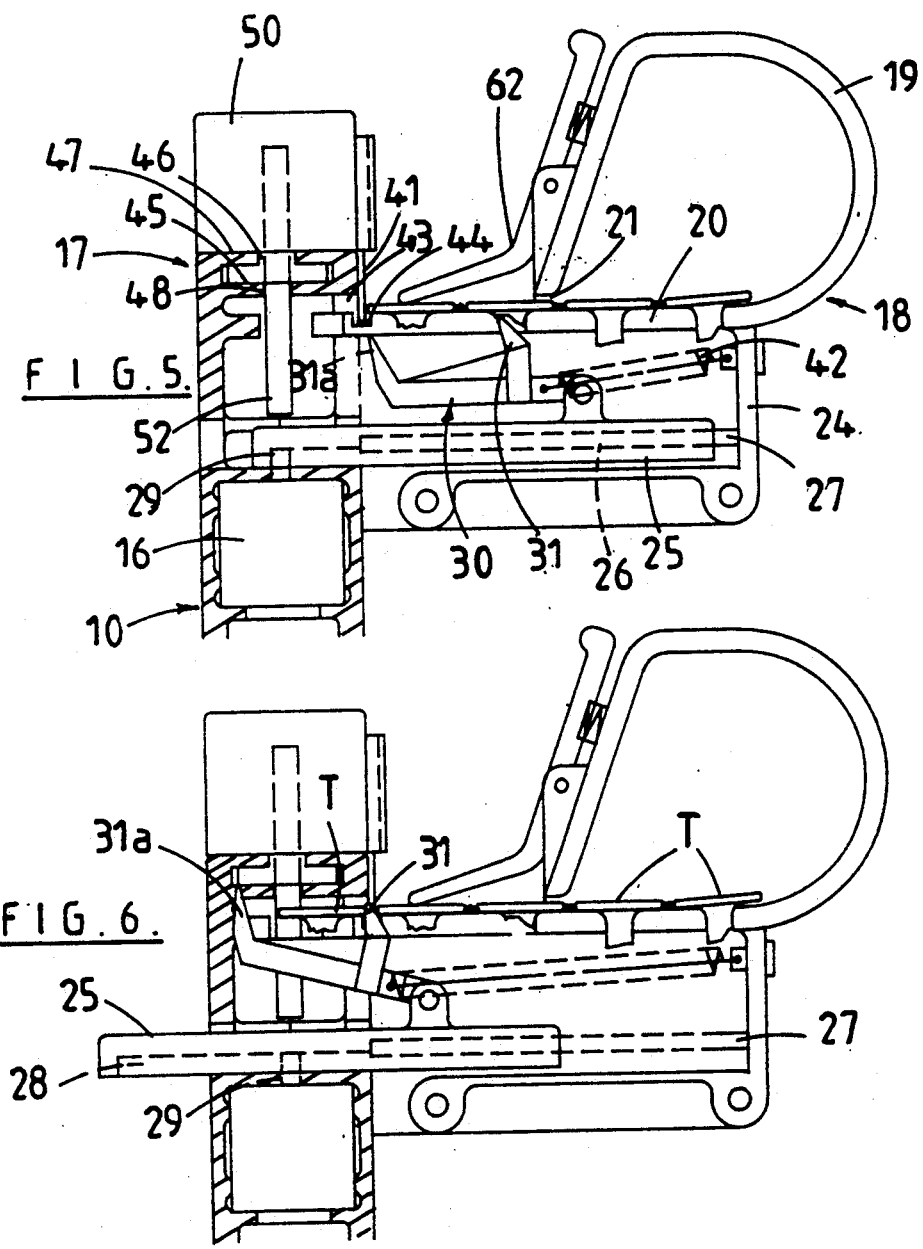

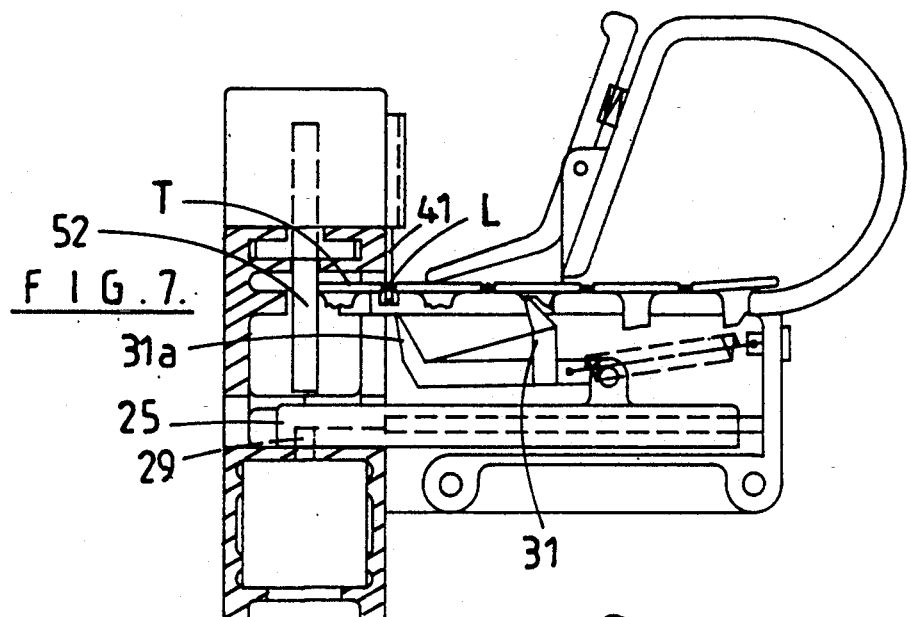
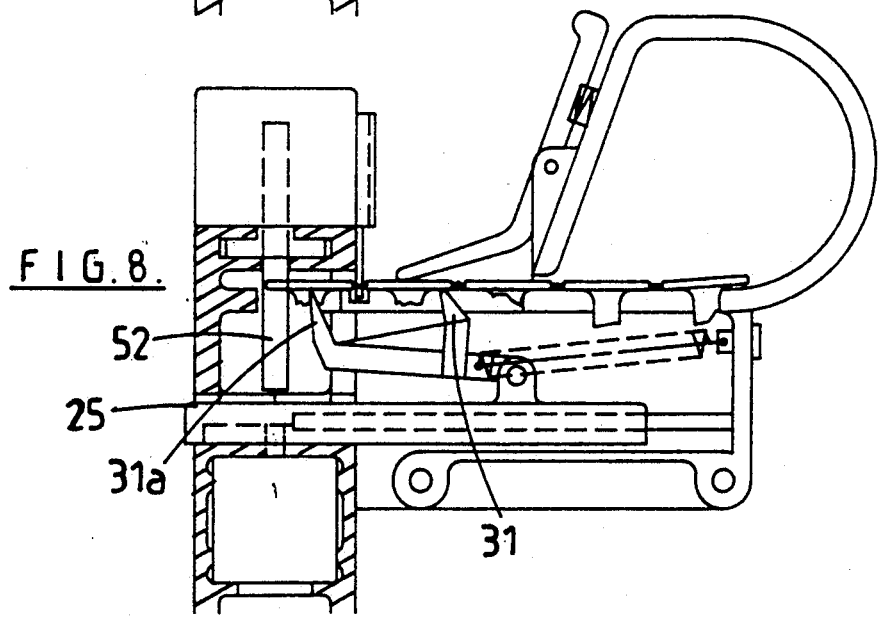

EAR TAG APPLICATOR

BACKGROUND OF THE INVENTION

1. Field of the Invention

This invention relates to an ear tag applicator tool.

A well known type of ear tag for use in the identification of small animals (such as sheep, calves etc) is of one piece construction comprising an elongate panel having a headed stem disposed at or near one end and an opening disposed at or near the other end. The tag is applied to an animal's ear by using an applicator tool which loops the panel about the edge of the ear and then forces the headed stem through the ear. The head as it protrudes through the ear snap locks through the opening in the panel to thereby fix together the ends of the panel and retain the tag in the ear.

2. Description of the Invention

When tagging, for example, sheep a large number of animals are tagged in relatively quick succession. This means that the operator must manually load a tag into the applicator tool prior to each tagging operation. The loading operation can be fiddly and even though a skilled operator can quickly load, apply the tag to the animal and re-load in a minimum time span the need to individually load each tag prior to application represents a considerable amount of the overall time taken to tag a number of animals. To reduce this time it is often the case that the operator will have two applicators with an assistant loading one applicator while the operator uses the other for tagging. In this way the operator does not need to pause to load an applicator prior to applying the tag.

It is a well known technique for a tag manufacturer to supply tags of the aforementioned type in a strip of tags located side by side. This can be achieved by the tags being mounted on a length of adhesive material. Alternatively the manufacturer can mould, as one piece, a strip of tags coupled side by side via integrally moulded frangible elements. Thus the operator can merely lift or break a tag from the strip prior to loading the tag into the applicator. This assists the operator or person loading the applicator as the tag is more readily to hand than is the case where a plurality of tags are located in a container or the pocket of an apron worn by the operator/loader.

To further speed up the operation of tagging a large number of animals in quick succession it has long been suggested to provide an applicator tool which is fully or partially self loading. For example in our New Zealand Patent Specification 211853 there is disclosed an applicator for a one piece tag. A part of the tag can be located in guide means and during operation of the applicator the applicator needle engages with the tag and applies same to the animal. In this way the operator does not need to physically load the tag onto the applicator needle. However, tags still do need to be loaded individually.

In our New Zealand Patent Specification 215888 there is disclosed an applicator for a one piece tag wherein the applicator incorporates a rotatable magazine having cavities. An individual tag can be pre-loaded into each cavity. The applicator, during operation thereof, removes a tag from a cavity whereupon the magazine indexes so that a new cavity with tag is presented for the next application operation. Thus while once again tags need to be individually loaded into the rotary magazine the operator can carry out tagging of a number of animals in quick succession prior to having to "reload" the applicator.

Likewise in New Zealand Patent Specification 191261 there is disclosed an applicator tool for one piece tags wherein a plurality of tags are loaded (one at a time) into the applicator. The tags are then individually indexed by operation of the tool to a tag reception area which presents the tag ready for application to the animals ear. Thus as with the applicator of Patent Specification 215888 the operator can tag a number of animals in quick succession, however, there is still the need for individual loading of tags into the applicator.

SUMMARY OF THE INVENTION

The prime object to the present invention is therefore to provide an applicator tool into which a plurality of tags can be loaded substantially as a unit, the tool having such a construction and operation that individual tags, during successive operations of the applicator tool, can be presented for application to an animal.

Broadly therefore the present invention consists of an applicator tool for animal ear tags the applicator tool comprising a tag reception area in which a tag to be applied can be located, tag engagement means, and operative means whereby said tag engagement means can apply a force to at least part of the tag in said tag reception area to apply said tag to an animal, said applicator tool including tag location means with which a plurality of tags which are conjoined can be located, there being tag transport means which is operative to transport a tag taken from said plurality of conjoined tags to said tag reception means.

BRIEF DESCRIPTION OF THE DRAWING

In the following more detailed description of the invention reference will be made to the accompanying drawings in which.

DETAILED DESCRIPTION OF THE INVENTION

Figure 1:
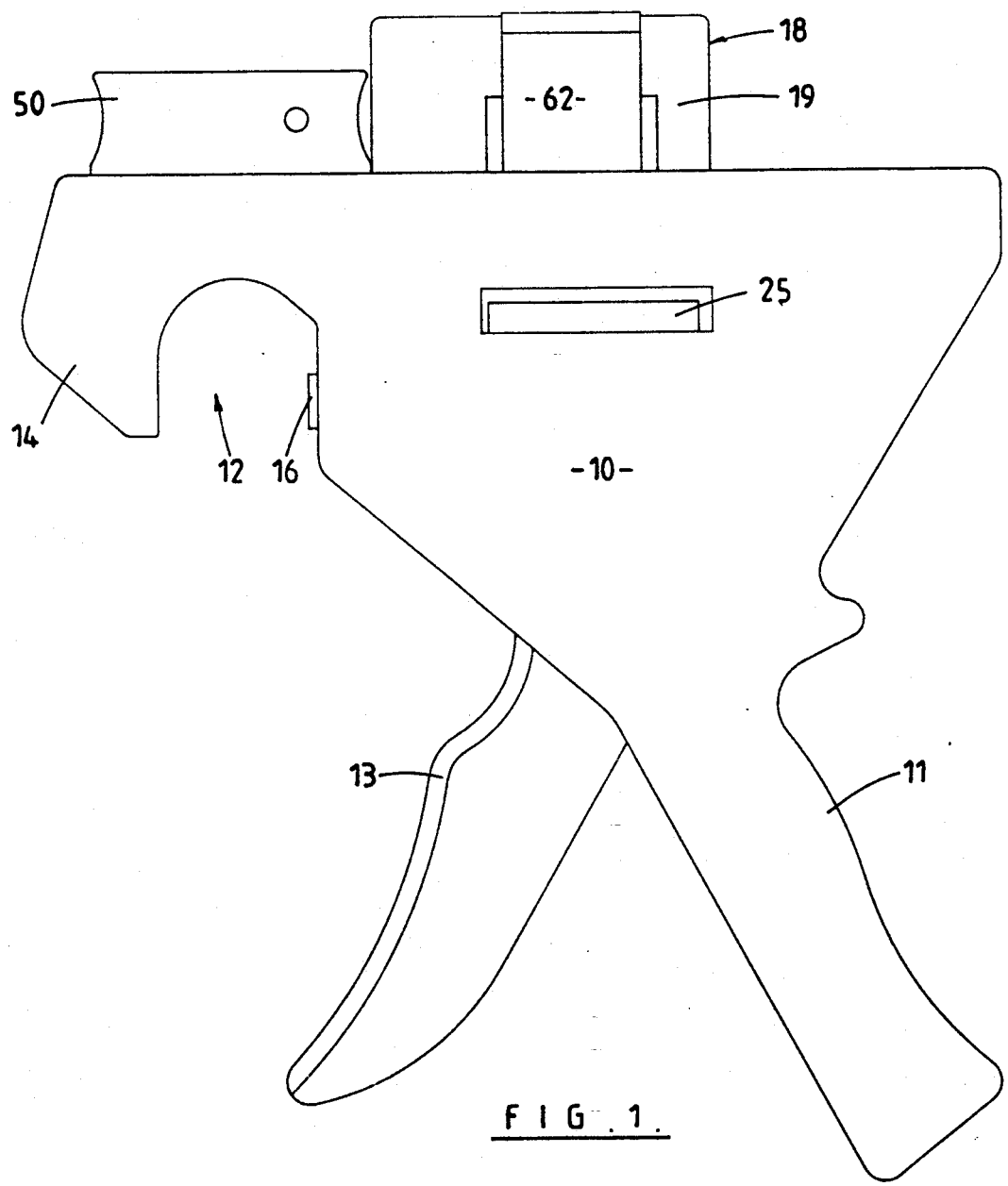
FIG. 1 is an elevation view of one form of applicator tool according to the present invention.

According to the embodiment of the invention shown in the drawings the applicator comprises a body 10 with an integrally formed handle 11. Preferably the body is moulded from a plastics material of any suitable type which provides sufficient rigidity, robustness and durability.

The applicator is formed with or connected to an anvil 12 which is of generally inverted U shape. Distal leg 14 of anvil 12 is provided with a recess 57. A tag T located within the tag receiving area formed by anvil 12 is so located that the panel P is curved with the end of the panel having opening O being located in recess 57. The other end of panel P is located in a recess 59 slidably mounted in applicator member 16. Thus the stem and conical head H projects from the applicator member 16 as shown and is disposed substantially opposite opening O. Thus as the applicator lever 13 is "closed" applicator member 16 slides toward leg 14 thereby applying a force to the base of the stem which forces head H through the animal's ear (which is located within the confines of anvil 12) so that the head passes through the animal's ear and snap locks (see FIG. 3) through opening O in a conventional manner.

Figure 2:
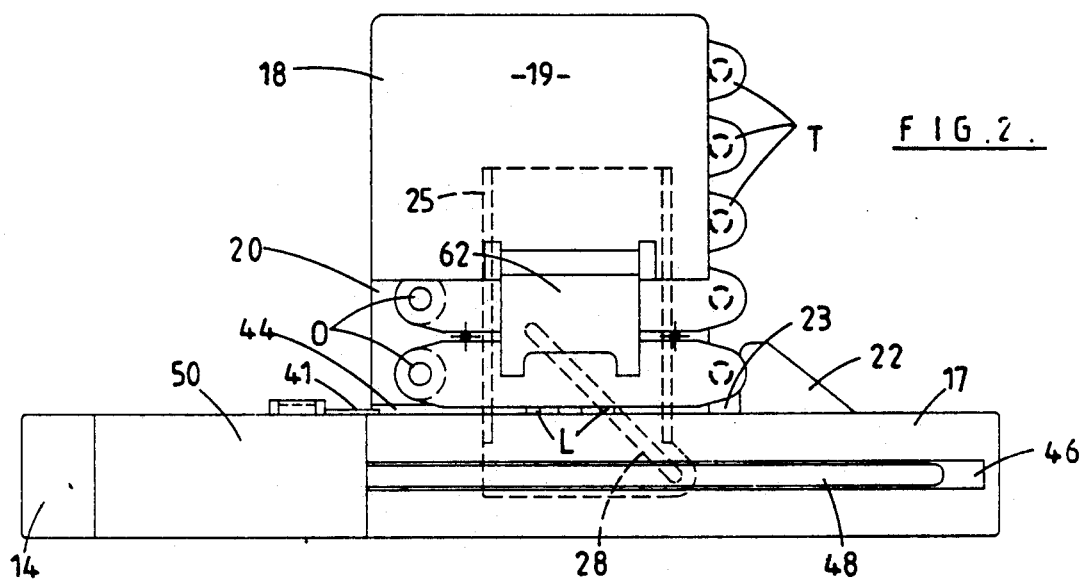
FIG. 2 is a plan view of the applicator tool as shown in FIG. 1
Figure 4:
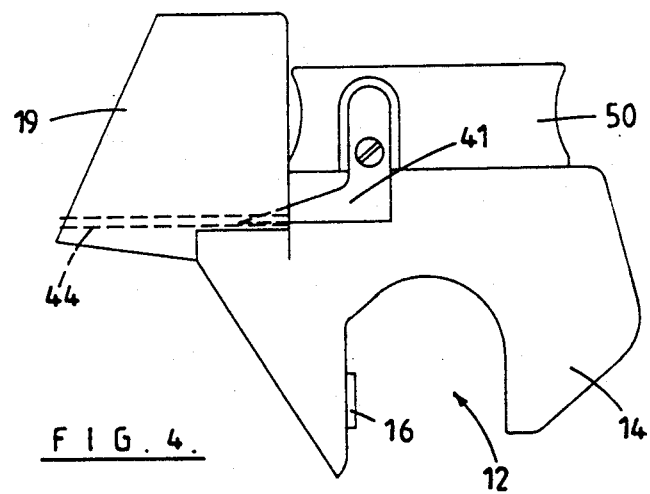
FIG. 4 is a partial view of the anvil portion of the applicator as viewed from the side opposite to that shown in FIGS. 1 and 3, and FIGS. 5-8 are end views taken from the right hand side of FIG. 2 but in partial cross-section and with the end plate of mounting 24 removed.

Located atop the applicator body 10 is a guide 17 and disposed adjacent thereto is a magazine 18. This magazine 18 is formed by a substantially cylindrical housing 19 and a flat portion 20 there being an opening in the form of a gap 21 between the terminal edge of the housing 19 and flat plate 20. Disposed adjacent the rearward edge of plate 20 is a projection 22 so that a space 23 exists between projection 22 and plate 20. Thus a strip of conjoined tags T can be wound into a tight coil and placed within housing 19 with one end of the strip projecting through gap 21 to lie against plate 20. As shown in FIG. 2 the stems S are located outside the housing 19 and are essentially aligned with gap 23.

Magazine 18 is mounted to the applicator body via a base 24. This base 24 has slidingly engaged therein a slider 25. The slider 25 is essentially planar and has grooved edges 26 with rails 27 on the opposed side walls of mounting 24 engaged in the grooved edges 26.

The underside of slider 25 carries an inclined groove 28. As will hereinafter be described a pin 29 slidingly engages in slot 28.

Located within mounting 24 and coupled with slider 25 is a tag advance finger 30. This finger 30 includes one or preferably a pair of upstanding lugs 31 which are so shaped and dimensioned that they can engage in the gap (see FIG. 2) between adjacent tags this gap existing because of the spacing of the tags arising from lugs L which join the tags together.

As illustrated applicator lever 13 is pivotally mounted and a return spring 32 mounted within handle 11 applies a biasing force to lever 13. Attached to lever 13 is a sear 33 which is pivotal about a pin 34. A support 35 engages with a part of sear 33 which is to an opposite side of pin 34 to which sear 33 engages with the applicator member 16.

Applicator member 16 is of generally cylindrical shape and its leading end slidingly engages in a bush 36. A cap 37 is provided at the trailing end of applicator member 16 and this slidingly engages in a bore 38 formed in the body of the applicator tool. A biasing spring 39 engages between a mounting 39a in a bore in member 16 and an anchor 39b in body 10.

Figure 3:
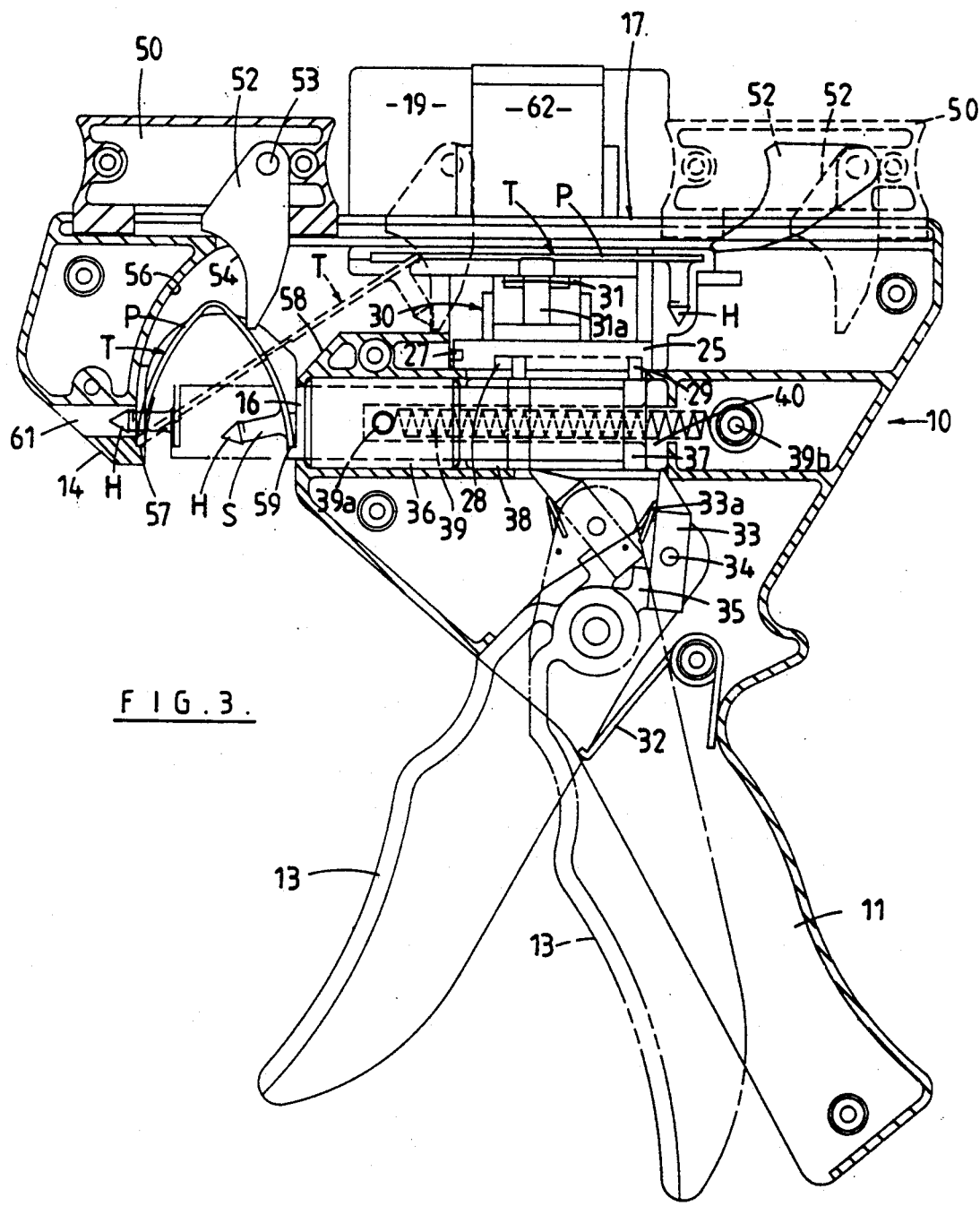
FIG. 3 is a sectioned elevation view of the applicator tool as shown in FIG. 1.

Sear 33 engages with cap 37. As the lever 13 is moved toward handle 11 cap 37 is pushed along bore 38 thereby moving the leading end of applicator member 16 toward leg 14. At a point which corresponds with full application of the tag, i.e. the male member has passed through the ear of the animal and become snap locked in the opening O sear 33 "loses" contact with cap 37 (as shown in FIG. 3) whereupon spring 39 causes the applicator member 16 to retract.

As lever 13 is released back to its rest position under the influence of return spring 32 the sear contacts the leading edge of cap 37 which causes the sear to pivot about pin 34 until such time as the end of sear 33 has passed beyond the pressure surface of cap 37 whereupon it pivots, under the influence of the bias of spring 33a, to engage behind cap 37. At the end of bore 38 there is provided a cushion member 40 to absorb the impact of member 16 returning under the influence of spring 39.

As applicator member 16 moves under the influence of lever 13 pin 29 which is mounted with cap 37 also moves longitudinally along the body of the applicator. As slot 28 is inclined to this longitudinal movement the interaction of pin 29 and slot 28 causes slider 25 to move in the direction shown by the arrow in FIG. 6.

Tag advance finger 30 has at its leading end a lug 41 which in the rest position of slider 25 engages on the underside of plate 20 (see FIG. 5). As slider 25 is moved in the direction of the arrow this lug 31a clears the terminal edge of plate 20 which due to a spring bias provided by spring 42 causes the tag advance finger 30 to be lifted. As a consequence lugs 31 become engaged in the gap between the leading tag T and the next adjacent tag. Continued movement of slider 25 causes this leading tag to be pushed toward and into guide 17 there being an elongate slot 43 formed in the side wall of the guide 17 for this purpose. At the completion of the movement of slider 25 in the direction of the arrow the joining lugs L between the leading tag and the next adjacent tag locate immediately adjacent the side wall of the guide and in the preferred form of the invention over a small groove 44 formed in plate 20.

Guide 17 is internally divided by a wall 45. A slot 46 is formed in the upper wall 47 of the guide and a corresponding slot 48 is formed in wall 45.

A slider 50 is slidingly mounted on the guide 17. Mounted with slider 50 is a knife member 41 which extends downwardly adjacent the side wall of guide 17. Thus as slider 50 is moved along guide 17 away from the anvil this knife member 41 cuts the lugs L between the leading tag and the next adjacent tag. Groove 44 provides a clearance to ensure that the knife member 41 projects sufficiently downwardly to be able to completely sever lugs L. As a consequence the leading tag is severed from the remainder of the tags held in the magazine.

Projecting downwardly from slider 50 is a pivoted finger 52, the point of pivot of the finger being provided by pivot 53. As the slider 50 is moved along the guide 17 as previously described, finger 52 pivots so as to ride over (see FIG. 3) the top of the leading tag located in guide 17. Once slider 50 has reached the terminal point of its movement (dotted detail in FIG. 3) finger 52 has passed beyond tag T so as to project downwardly and be engaged behind (see FIG. 7) the male member end of the tag.

Finger 52 includes a curved surface 54 and this surface engages with the tag as the slider 50 is moved back along guide 17. This causes the tag to move along the guide. During the initial movement of the tag T the leading or female end of the tag engages with a guide element 55 which guides the tag out of slot 43 and fully into the guide 17.

Movement of tag T along the guide continues until the female end engages with a curved surface 56 leading into leg 14 of the anvil 12. As a consequence the leading end of the tag follows the curve 56 such that the end having opening O finally engages in a recess 57 in leg 14. Continued movement of slider 50 causes the tag T to bend to a point whereby the male end of the tag slides down curved surface 54 whereupon it leaves the curved surface 54 to engage on an inclined face 58. The lower end of finger 52 then engages with the surface of the panel of the tag so as to force the male end of the tag down inclined face 58 and into engagement with the leading end of applicator member 16. A recess 59 is formed in the leading end of applicator member 16. This recess includes a face 60 such that if the male end of the tag does not fully seat into recess 59 forward movement of the applicator member 16 during initial closing of the applicator causes the male end to slide downwardly and locate fully in the recess as shown in FIG. 3.

Thus once slider 50 has completed its forward movement the tag is located in the anvil 12 in a position whereby application of the tag to an animal can commence. Preferably a latching arrangement (formed say by an interference fit between guide 17 and a part of the slider 50) holds the slider in position during the tagging operation. This prevents any upward movement of the tag during application such upward movement possibly leading to misapplication.

The operator can thus take the applicator to the animal's ear and after positioning the ear between stem S and opening O can close the lever 13 such as to force head H through the animal's ear and into a snap locking engagement with opening O. Located behind opening O is a bore 61 which provides a clearance for the head of the stem as it passes through the opening and also provides a passage for any hair, gristle etc which may be expelled during the tagging operation.

As described previously the applicator member 16 will retract automatically once coupling of the head H and opening O has been completed. Therefore if the animal jerks its head no damage to the applicator will occur as generally this jerking movement associated with a pulling away by the operator will cause the tag to free from the anvil of the applicator.

Having completed the tagging operation the operator then moves slider 50 back along guide 17 whereupon blade 41 will sever the next leading tag this leading tag having, during application of the loaded tag, been pushed into slot 43 and thereby in a position for the severing action to take place.

By using the applicator a plurality of tags can be applied to a number of animals in relatively fast succession. At the commencement of a tagging operation the operator will move slider 50 back along guide 17 to sever a tag and then by reverse movement of the slider load the tag into the anvil 14. Immediately application of that tag to an animal has taken place the operator will repeat the operation whereby a further tag will be loaded into the anvil for application to the next animal.

It will be observed from FIG. 6 that lug 31a once clear of the terminal edge of plate 20 moves upwardly under the influence of spring 42 to enable lugs 31 to engage between the tags. If, however, the applicator lever 13 is moved so as to advance applicator member 16 when there is already a tag located in slot 43 (see FIG. 8) lug 31a will engage on the underside of that tag and will not be able to move upwardly by a sufficient amount for lugs 31 to engage between the next leading and following tags. As a consequence a further tag cannot be pushed into slot 43 until the tag in the slot has been cleared along guide 17 to the anvil 14.

In a preferred form of the invention a pressure pad or finger arrangement 62 is mounted with housing 19 whereby a downward pressure can be applied to the leading tag T. Thus this leading tag is only subjected to the forward moving pressure of lugs 31 but also the downward pressure of the pressure plate or fingers 62 thereby ensuring that the tag moves correctly into slot 43 in the wall of the guide 17.

Thus the present invention provides an applicator tool whereby a plurality of conjoined tags can be loaded into the magazine whereby the user does not need to physically manipulate a tag into the anvil prior to each application procedure. All that the operator need do is move the slider 50 back and forth so as to sever a tag and move that tag into the anvil area ready for the next tagging operation.

I claim:

1. An applicator tool for animal ear tags, the applicator tool comprising:

a tag reception area in which a single tag to be applied can be located;

application means for applying a force to at least part of said single tag situated in said tag reception area in order to attach said single tag to an animal;

tag location means for locating a plurality of tags which are conjoined;

guide means for providing movement so that a leading tag of said plurality of tags can be moved from said tag location means to said tag reception area;

tag transport means for causing said single tag to move along said guide means means for removing from said plurality of tags, said leading tag of said plurality of tags located at least partially in said guide means to thereby result in said single tag available for transporting by said tag transport means to said tag reception area;

operating means for causing operation of said application means to take place; and tag advance means for causing said leading tag of said plurality of tags to become at least partially located within said guide means, said tag advance means being operable in direct response to said application means being operated by said operating means to apply said force to the single tag in said tag reception area.

2. An applicator tool as claimed in claim 1 wherein said tag transport means includes said removing means.

3. An applicator tool as claimed in claim 1 or 3 wherein the tag transport means includes tag engaging means for engaging said single tag after said single tag has been removed from said plurality of conjoined tags.

4. An applicator tool as claimed in claim 3 wherein said tag transport means includes a shifter element associated with said guide means, said shift element incorporating said tag engaging means whereby movement of the shifter element moves said single tag along the guide means.

5. An applicator tool as claimed in claim 4 wherein the tag removing means is formed by a cutting edge carried by said shifter element, said cutting edge being mounted to locate between said leading tag of said plurality of tags at least partially into said guide means a next adjacent tag such as to sever the joint between said tags.

6. An applicator tool as claimed in claim 5 wherein the tag engaging means is mounted with the shifter element such that upon movement of the shifter element in one direction relative to the guide means the tag engaging means moves over said single tag whereupon reverse movement of the shifter element relative to the guide means causes said tag engaging means to be engageable with said single tag and cause said single tag to be moved along the guide means.

7. An applicator tool as claimed in claim 6 wherein the tag reception area is formed by an anvil section of substantially inverter U shape, said anvil section including a first locating guide which guides and locates a first portion of said single tag transported by said transport means, the tag engaging means including a second location guide which guides a second portion of said single tag such that said second portion of said single tag becomes disposed substantially opposite said first portion.

8. An applicator tool as claimed in claim 7 wherein the application means is a sliding member mounted for rectilinear movement and includes a locating recess into which said second portion of the single tag is locatable after passing along said second locating guide, said operating means being a pivoted lever having means to engage with said sliding member such that movement of the pivoted lever results in said rectilinear movement of the sliding member such that relative movement between said first and second portions of said single tag situated in the tag reception area can take place.

9. An applicator tool as claimed in claim 9 further including release means operative to cause the sliding member to move in a reverse direction under the influence of biasing means upon the sliding member having reached a predetermined extent of travel caused by movement of said pivoted lever.

10. An applicator tool as claimed in claim 1 where the tag location means is a housing in which a rolled up said plurality of conjoined tags can be located, said tag location means having an opening through which one end of the plurality of conjoined tags can pass such that the leading tag is presented such as to become said single tag for transporting by said transporting means to said tag reception area.

11. An applicator tool as claimed in claim 1 wherein the tag advance means is formed by a tag advance finger for engaging said leading tag of said conjoined tags, said tag advance finger being coupled to a slider movable transverse to the direction of movement of the application means, said application means including a follower engaged with a groove included with said slider said groove being oriented such that as the application means is moved by said operating means said follower causes the tag advance finger to move in said transverse direction such that said leading tag of said plurality of tags is moved at least partially into said tag guide means.

* * * * *